United States Patent
Zepp et al.

(10) Patent No.: US 6,555,941 B1
(45) Date of Patent: Apr. 29, 2003

(54) BRUSHLESS PERMANENT MAGNET MOTOR OR ALTERNATOR WITH VARIABLE AXIAL ROTOR/STATOR ALIGNMENT TO INCREASE SPEED CAPABILITY

(75) Inventors: Lawrence P. Zepp, Fort Wayne, IN (US); Jerry W. Medlin, Fort Wayne, IN (US)

(73) Assignee: Dura-Trac Motors, Inc., Ft. Wayne, IN (US)

( * ) Notice: Subject to any disclaimer, the term of this patent is extended or adjusted under 35 U.S.C. 154(b) by 0 days.

(21) Appl. No.: 10/094,216

(22) Filed: Mar. 8, 2002

(51) Int. Cl.[7] .................... H02K 16/00; H02K 16/01; H02K 1/122
(52) U.S. Cl. .................... 310/191; 310/90; 310/190; 310/209; 310/266; 310/114
(58) Field of Search .................... 310/191, 12, 40 C; 290/40 C, 209

(56) References Cited

U.S. PATENT DOCUMENTS

| | | | | |
|---|---|---|---|---|
| 645,247 A | * | 3/1900 | Cantono | |
| 3,394,295 A | * | 7/1968 | Cory | |
| 4,920,295 A | * | 4/1990 | Holden | 310/209 |
| 5,723,928 A | * | 3/1998 | Imai | 310/114 |
| 5,920,127 A | * | 7/1999 | Damron | 290/44 |
| 6,137,195 A | * | 10/2000 | Chitaya | 310/12 |
| 6,351,050 B1 | * | 2/2002 | Coles | 310/156.53 |
| 6,429,611 B1 | * | 8/2002 | Li | 318/115 |

* cited by examiner

Primary Examiner—Nestor Ramirez
Assistant Examiner—Iraj A Mohandesi
(74) Attorney, Agent, or Firm—Butzel Long

(57) ABSTRACT

A brushless permanent magnet electric machine with a fixed radial air gap is operated to a much higher speed than normal maximum speed by the reduction in effective magnet pole strength. Increasing the amount of axial misalignment of the permanent magnet rotor and constant velocity bearing proportionally increases the speed and reduces the torque. The permanent magnet rotor is offset axially to provide axial misalignment between the rotor magnet poles and the stator, reducing the effective magnet pole strength or flux to the stator. An integral constant velocity linear bearing is used to couple the movable rotor and the fixed position motor shaft. A thrust bearing is actuated to offset the magnetic rotor against the attractive magnetic forces toward the stator. The use of a constant velocity linear bearing allows the motor shaft, radial support bearings, position encoder, cooling fan, and output coupling to remain in a constant position while rotor position is offset.

22 Claims, 8 Drawing Sheets

FIG_3

FIG_5

BRUSHLESS PERMANENT MAGNET MOTOR OR ALTERNATOR WITH VARIABLE AXIAL ROTOR/STATOR ALIGNMENT TO INCREASE SPEED CAPABILITY

TECHNICAL FIELD

The present invention relates to permanent magnet electric machines of the radial air gap type. More particularly, the present invention relates to permanent magnet electric machines of the radial air gap type in which the axial alignment of the rotor and stator can be varied to control speed and applied torque.

BACKGROUND

Permanent magnet electric machines are known to be efficient producers/users of rotational power. Brushless permanent magnet machines eliminate the commutator and brushes that are commonly used with an electric controller that switches current to conductors in more conventional electric machines. The brushless electric controllers used in permanent magnet electric machines allow the conductor coils to be located in stationary motor stators, which react to movement of rotors containing permanent magnets.

Brushless permanent electrical machines are known for their durability, controllability, and absence of electrical sparking. These factors pose problems in commutator equipped electrical machines. When a brushless motor is driven by a power source, such as in vehicle regenerative braking or wind powered generators, the motor becomes a permanent magnet alternator.

Unlike many other types of electrical machines, permanent magnet electrical machines have a linear relationship between the product of EMF (voltage)×current (amps) and output torque. This characteristic is ideal for the traction loads of electric vehicles and other applications where a linear torque/speed relationship simplifies control.

Conventional permanent magnet machines can apply high output torques up to an rpm limit called the base speed. The base speed rpm is governed by the phenomena of permanent magnet machines building up "back-emf" electrical potentials as rotational speeds increase. The back-emf is governed by the magnetic gap flux density, number of winding turns, and rotational speed. As the rotational speed of a permanent magnet machine increases, the back-emf will build up until it equals the supplied voltage. Once the back-emf equals the supplied voltage, permanent magnet machines will not operate any faster. This back-emf rpm limiting characteristic protects permanent magnet machines from the over speed damage that is common with series wound electrical machines used in vehicle applications. The back-emf base speed characteristic that protects permanent magnet machines also tends to limit the dynamic rpm range.

In order to accelerate from rest or from low speeds, many electric vehicles have a fixed reduction drive ratio that is set for high torque. While such configurations provide the necessary high torque to overcome inertia, it results in a low base speed and a limited top speed. In addition to a low speed, constant torque operation, it is desirable for many motor vehicles to also have an upper range of constant power, where speed can increase with decreased torque requirements.

There are methods by which to operate a brushless permanent magnet motor or other motor type beyond the base speed. These methods can be broadly classified as either those using electrical means or those using mechanical means.

Methods of electrically enhancing speed or varying magnet flux include high current switching of additional phase coils or switching the way the phase coils are connected. The costs of such contactors and their contact wear tend to negate the advantages of a high durability brushless motor. Supplemental flux weakening coils have also been used to reduce stator flux and increase speed. This latter approach typically requires contactors and increases heating effects in the stator. Other methods can achieve higher speed operation by varying the waveform shape and pulse angle of the applied driving current or voltage.

Other known methods include the use of DC/DC amplifier circuitry to boost the supply voltage in order to achieve a higher motor speed. This method increases system costs and decreases reliability and efficiency. Such electrical approaches to increasing a motor's base speed are exemplified in U.S. Pat. Nos. 5,677,605 to Cambier et al., 5,739,664 to Deng et al. and 4,546,293 to Peterson et al.

Mechanical approaches to increasing a motor's base speed include configurations that vary the radial air gap between a tapered or conical rotor and stator. U.S. Pat. Nos. 829,975 and 1,194,645 to Lincoln disclose a conical rotor and shaft that is moved axially by a worm gear to adjust air gap and speed. U.S. Pat. Nos. 3,648,090 to Voin and 4,920,295 to Holden et al. each disclose a conical rotor in an alternator that is adjusted axially to vary air gap and the alternator output. U.S. Pat. No. 5,627,419 to Miller discloses a conical rotor that is moved axially to increase air gap and reduce magnetic drag on a flywheel energy storage system when the motor is not energized. In all of these patents, the rotor and stator remain engaged and changes in the magnetic air gap is achieved by small axial movements.

U.S. Pat. No. 3,250,976 to McEntire discloses motor stator coils of an AC induction motor that are moved axially between shorted and non-shorted portions of a dual rotor to vary speed. McEntire requires complex multiple lead screws or ball screws to effect stator movement and a double length rotor.

U.S. Pat. No. 5,821,710 to Masuzawa et al. discloses a magnet rotor that is split into two sections. For normal slow speed operation, the magnetic north and south poles of both rotor sections are aligned. As motor speed increases, centrifugal weights rotate one rotor section so the magnetic poles have increasing misalignment with speed. The magnetic pole misalignment causes a reduction in magnetic flux and back-emf, which allows the motor to run faster than normal base speed. This system is self contained, but requires a split rotor and the centrifugal apparatus to move the one rotor segment into misalignment. The strong repulsive forces of like magnet poles produce thrust to push the rotor segments apart. When the poles are misaligned, the attractive forces of unlike magnetic poles add to the centrifugal positioning force and override the springs used to restore the alignment position. These factors add to the complicated design and effect durability, and cost.

U.S. Pat. No. 6,194,802 to Rao discloses a pancake type motor that uses a fixed axial air gap. In this type of motor the axial gap is functionally equivalent to the radial gap in an internal cylindrical rotor motor design with a radial air gap. The individual magnet sectors in the rotor are mounted on spring loaded radial tracks. When the rotor rpm increases, centrifugal force causes the magnet sectors to extend radially, reducing the active area of magnet aligned with the stator coil and reducing the back-emf. This causes the motor to run faster than the base speed. Rao is similar to Masuzawa et al. and Holden et al. mentioned above in the centrifugal method of activation. The design of Rao requires extensive machining of the radial magnet tracks which increases costs and adds to the complexity. In addition, maintaining a sufficient level of balance of this magnet rotor is complicated by several factors. Even after the rotor is balanced with the magnets at their inboard position, as speed increases the position of the individual magnets is affected by difference in mass of the magnets, spring constants/rates, and sliding friction of the magnets along the tracks. Small variations in the resultant in the individual magnet positions would have a disastrous effect on the balance at high rotor speeds. These factors would necessarily adversely effect the ability to reduce back-emf of the motor and operate above the base speed.

DISCLOSURE OF THE INVENTION

According to various features, characteristics and embodiments of the present invention which will become apparent as the description thereof proceeds, the present invention provides a brushless permanent electrical machine which includes:

- a stator having a plurality of stator magnetic poles and windings for generating a rotating field in the stator magnetic poles, said stator having a central axis and a substantially uniform inner diameter;
- a rotor provided with a plurality of permanent magnets at a peripheral surface thereof and having a central axis which coincides with the central axis of the stator, the rotor further having a substantially uniform outer diameter;
- a rotatable shaft upon which the rotor is coupled, the rotatable having a central axis which coincides with the central axis of the stator; and
- means for moving the rotor with respect to the stator along the rotatable shaft.

The present invention further provides a method of operating a brushless permanent magnet electric machine beyond its normal base speed which involves:

- providing a brushless permanent magnet electric machine having a stator, a rotor, and a rotatable shaft upon which the rotor is coupled; and
- moving the rotor with respect to the stator along the rotatable shaft.

The present invention also provides a brushless permanent electrical machine in combination with a vehicle in which the brushless permanent electrical machine comprises a motor for driving the vehicle, and can also comprise a generator for a braking system of the vehicle.

The present invention further provides a brushless permanent electrical machine in combination with a power generating system in which the brushless permanent electrical machine comprises a generator and which power generating system can comprises a wind powered generator.

BRIEF DESCRIPTION OF DRAWINGS

The present invention will be described with reference to the attached drawing which are given as non-limiting examples only, in which.

BEST MODE FOR CARRYING OUT THE INVENTION

Figure 1:
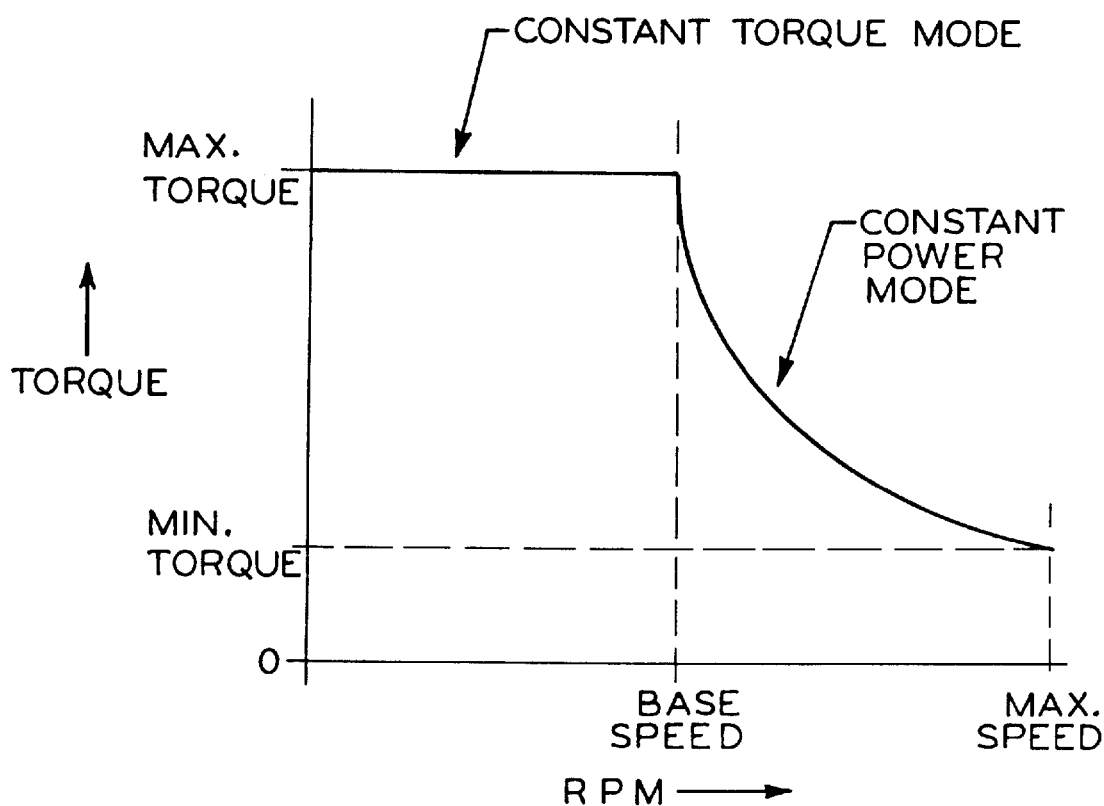
FIG. 1 is a graph depicting the relationship between speed and torque for a typical air gap motor of the present invention.

Many applications desire the merits of a brushless permanent magnet motor, but require operation significantly beyond the base speed. In electric vehicle applications, low speed operation often requires constant torque operation at less than the base speed for moving heavy loads, or traversing rough terrain or inclines such as hills. In many cases, high speed operation requires double or triple the base speed for cruising on level roads or developed industrial sites. In this high speed mode, torque requirements are low and constant power operation is desired. In constant power operation the available torque is inversely proportional to the speed. Constant power mode in a motor equipped with a mechanism that controls back emf provides an operation that is similar to shifting gear ratios in a transmission, i.e., higher speeds are traded for lower available torque. A motor that is able to shift from constant torque mode to constant power mode with speed extending beyond the base speed according to the present invention can be utilized as a magnetic variable transmission.

Conversely, a wind power generating unit needs an alternator that will start at minimum torque for light winds. This minimum torque exists when the back emf is at a minimum point. When wind speed and power increases, a maximum back emf will generate more power. By using the continuously variable magnetic transmission of the present invention, a wind generator controller can maximize the amount of energy that can be captured from the available wind.

Since a brushless permanent magnet motor requires an electronic controller to switch the currents to the stator phase coils, additional benefits can result according to the present invention by having independent back emf control by the motor controller as opposed to direct control of motor centrifugal force. In these same electric vehicle applications, high speed operation will often be followed by a speed reduction requiring regenerative braking by the motor. Regenerative braking is a control phase in which the motor acts as a generator, slowing the vehicle and returning energy to the batteries. By having the back emf adjusted by the controller (using an independent actuator) as opposed to centrifugal force, allows the motor to be shifted back into constant torque mode for optimum regenerative braking.

The present invention includes a method of axially displacing the rotor of a radial gap permanent magnet motor to reduce back emf and increase speed above the normal base speed. The invention utilizes a permanent magnet rotor with integral constant velocity linear bearing coupling the rotor to the motor shaft. An integral constant velocity linear bearing is used to couple the movable rotor and the fixed position motor shaft, while maintaining alignment between the rotor magnet poles and the shaft position encoder. As the rotor is offset into greater misalignment with the stator, the magnet flux on the stator field coils is reduced, reducing the back emf that limits speed. With the rotor misaligned, the motor operates in constant power mode, where available torque is inversely proportional to speed. The rotor can be moved axially by a hydraulic, electromechanical, manual, or other actuator means connected to a lever or other means.

The rotor and stator have a constant cylindrical shape and are well suited to be manufactured using low cost identical stacked laminations. The magnets are rigidly fixed to the stator by adhesive bonding or other means making high speed balance and durability easy to maintain. The low friction linear bearing allows the magnetic attraction of the rotor and stator to provide sufficient restoring force to constant torque operation. The linear bearing also maintains alignment between the rotor magnet poles and the shaft position encoder that synchronizes the switching of the motor phase coils.

The present invention will now be described with reference to the attached drawings which are given as non-limiting examples only. Throughout the various figures, common reference numbers have been used to identify common elements.

FIG. 1 is a graph depicting the relationship between speed and torque for a typical air gap motor of the present invention. In FIG. 1 the motor torque, which increases through a minimum torque up to a maximum torque for a given motor, is plotted against motor speed. The minimum torque is the torque required to drive the motor when the back emf is theoretically reduced to zero. The motor's base speed, which as discussed above is that speed at which back emf equals applied voltage, is shown on the horizontal axis of the graph in FIG. 1. Below the motor base speed a constant torque mode is shown. Above the base speed, and up to the motor maximum speed, a constant power mode is shown. In this latter mode, as the torque is lowered current increases resulting in a speed increase. The constant power mode is the motor speed addressed in the present invention.

Figure 2:
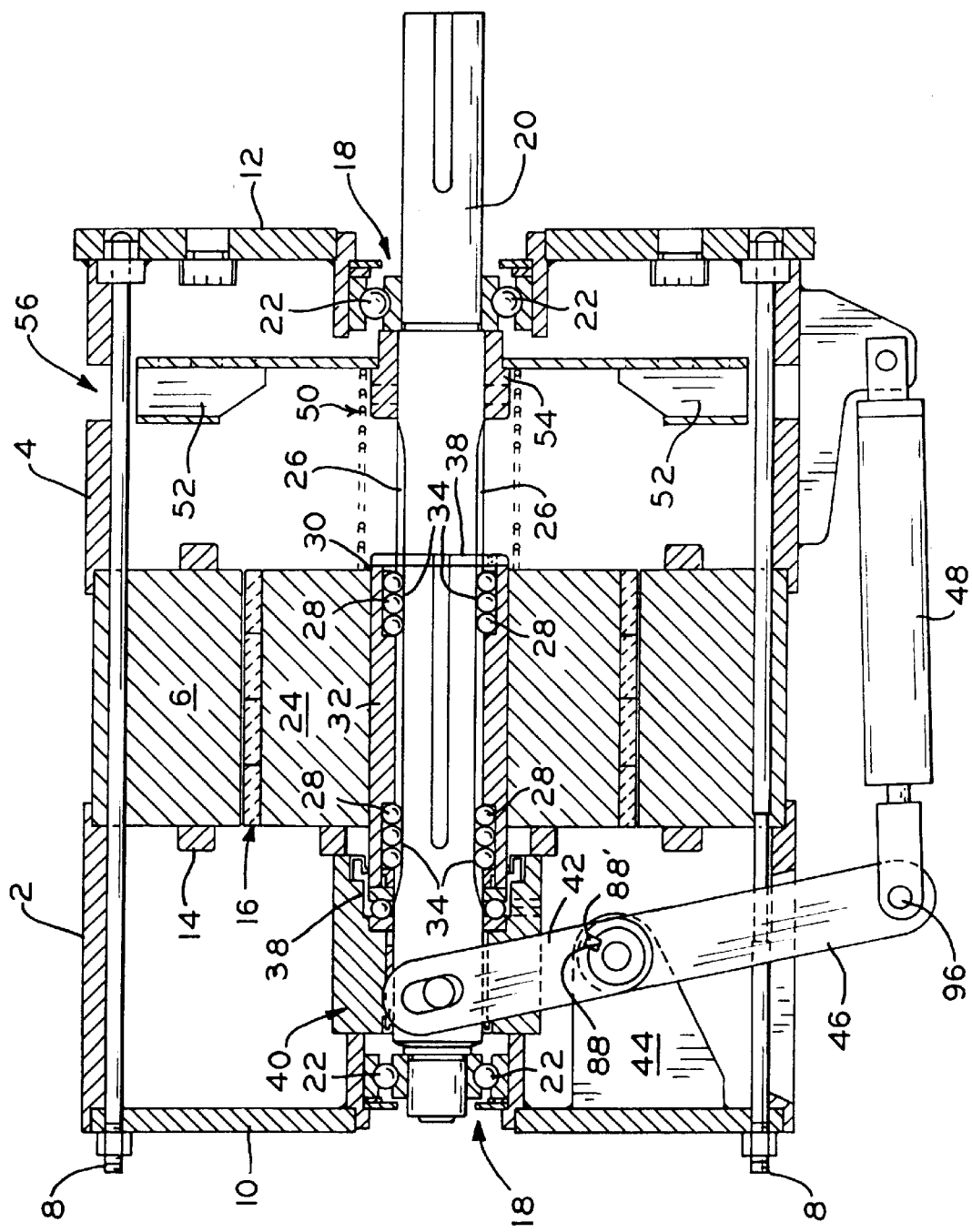
FIG. 2 is a cross-sectional view of permanent magnet electric machine according to one embodiment of the present invention in which the rotor is fully engaged with the stator.

FIG. 2 is a cross-sectional view of permanent magnet electric machine according to one embodiment of the present invention in which the rotor is fully engaged with the stator. The permanent electric machine depicted in FIG. 2 includes a housing which is formed by a com end motor housing portion 2 and a drive end motor housing portion 4. The two housing portions 2, 4 depicted in FIG. 2 are positioned on either side end of stator 6 and secured in position by a plurality of tie rods 8 that coupled to housing end plates 10, 12. As can be seen, since the stator 6 of the present invention is held stationary, it can be incorporated into the motor housing structure. Alternatively, the motor housing could enclose the stator 6 by extending along the outer diameter thereof. Essentially, any suitable housing structure could be used in the present invention, provided that provisions are made to hold the stator 6 in a fixed position. The stator windings 14 are depicted in FIG. 2 and discussed in more detail below.

Bearing assemblies 18 provided centrally in end plates 10, 12 receive motor shaft 20 therethrough. The bearing assemblies 18 include radial ball bearings 22, and can be of any conventional design. The motor shaft 20 is allowed to rotate in bearing assemblies 18, but is restricted from moving axially.

Rotor 24, having magnets 16 on the outer surface thereof, is configured to rotate together with motor shaft 20 and move axially along motor shaft 20 as will now be described. The motor shaft 20 includes a plurality of parallel grooves 26 formed in the outer surface thereof which extend alone a central portion thereof. The grooves 26 have a semicircular cross-sectional shape and are configured to receive a plurality of ball bearings 28 therein. The rotor 24 includes a central bore 30 which receives rotor sleeve 32. Rotor sleeve 32 is coupled to the rotor 24 as discussed below and includes a plurality of parallel grooves 34 formed in an inner surface thereof. Grooves 34 have a semicircular cross-sectional shape and are configured to receive a plurality of ball bearings 28 therein. When rotor sleeve 32 is positioned over motor shaft 20 and grooves 26 in motor shaft 20 are aligned with grooves 34 in the rotor sleeve 32, they form channels in which ball bearing 28 can be held. The ball bearings 28 are contained within the channel formed by grooves 26 and grooves 34 by an annular cap 36 on one end of the rotor n sleeve 32 and a retaining ring 38 that is attached to the opposite end of the rotor sleeve 32. An alternative arrangement could use retaining rings on both ends of the rotor sleeve 32.

The rotor 24 is allowed to slide axially along motor shaft 20 with ball bearings 28 reducing friction between the rotor 24 and motor shaft 20.

FIG. 2 depicts one means for moving and positioning rotor 24 axially along motor shaft 20. In FIG. 2 one end of the rotor 24 is coupled to a thrust bearing assembly 40 which can move axially along motor shaft 20. Thrust bearing assembly 40 is coupled to a yoke assembly 42 that can pivot about pivot brackets 44 (one shown in FIG. 2). The yoke assembly 42 is actuated (pivoted) by pivoting pivot arm 46 about the pivot axis of yoke assembly 42 as discussed in more detail with reference to FIG. 5 below.

FIG. 2 depicts a hydraulic or pneumatic actuator 48 coupled to pivot arm 46 for actuation thereof. FIG. 2 also depicts a biasing means, e.g. spring 50, that is coaxial with motor shaft 20 and provided on the opposite side of the rotor 24 from thrust bearing assembly 40, which biasing means assists in returning rotor 24 to an initial position before it is pushed by thrust bearing assembly 40.

The permanent magnet electric machine of FIG. 2 includes a fan 52 that is coupled to motor shaft 20 by fan hub 54 for rotation therewith. Fan 52 is provided to cool the permanent magnet electric machine. In this regard, the drive end of motor housing portion 4 is provided with vents 56 into which ambient air can be drawn my fan 52 and forced through the permanent magnet electric machine.

Figure 3:
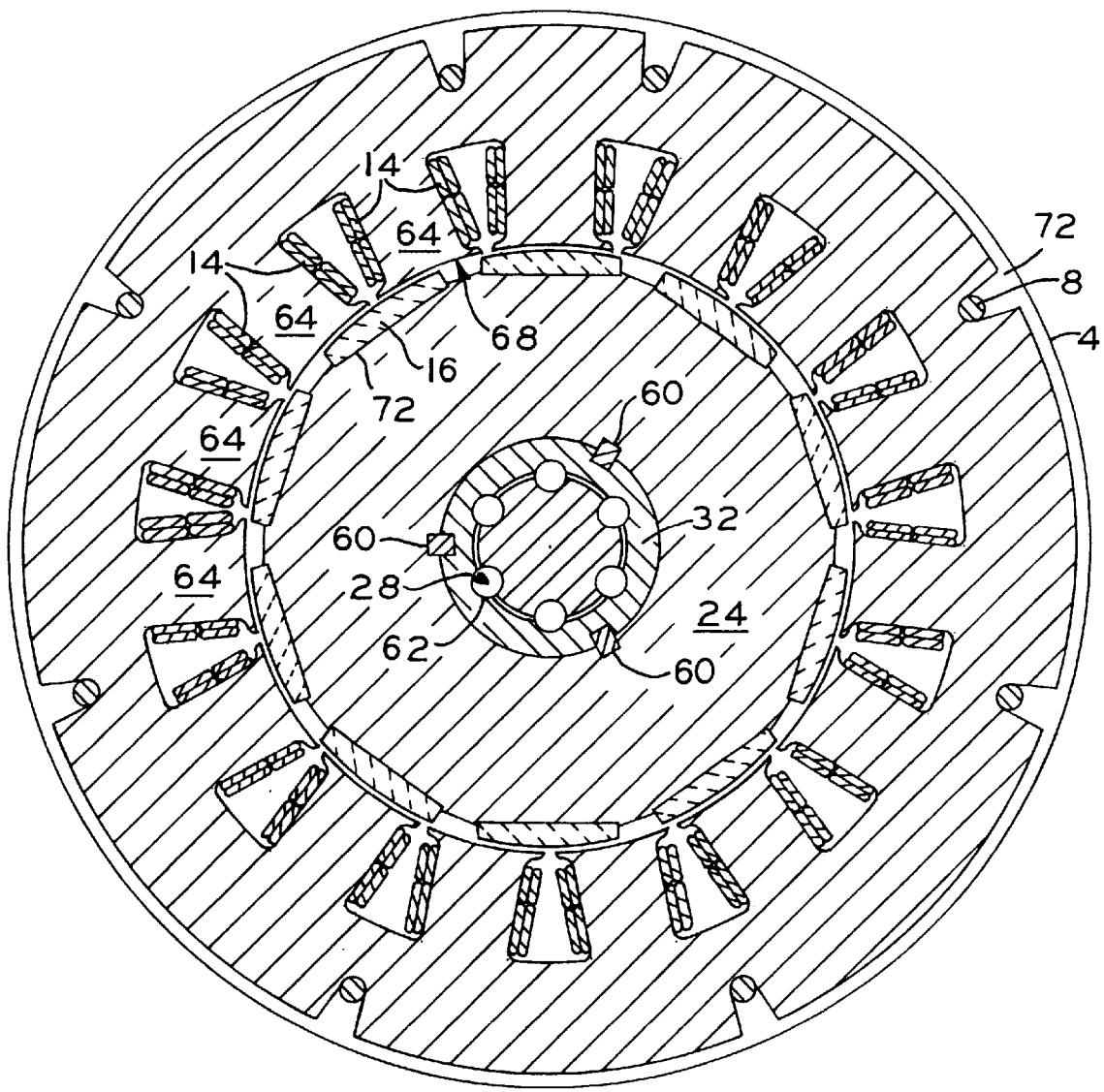
FIG. 3 is a cross-sectional end view of a stator, rotor and constant velocity bearing according to one embodiment of the present invention.

FIG. 3 is a cross-sectional end view of a stator, rotor and constant velocity bearing according to one embodiment of the present invention. FIG. 3 shows the use of key elements 60 that can be used to secure the rotor sleeve 32 to the rotor 24. In an alternative embodiment, engaging or interlocking structural elements could be formed on either or both of the outer surface of the rotor sleeve 32 and/or the inner surface of the bore 30 provided in rotor 24.

FIG. 3 depicts the channels 62 that are formed between grooves 34 in rotor sleeve 32 and grooves 26 formed in the motor shaft 20 when these grooves are aligned with one another. FIG. 3 also shows how ball bearings 28 couple motor shaft 20 and rotor 24 (via rotor sleeve 32) together to provide a constant velocity linear bearing.

As shown in FIG. 3, the rotor 24 includes a plurality of inward depending teeth 64 having wire coils 14 wound thereon. The teeth 64 have widened inner facing radial surfaces 68 which are opposed to complementary radial surfaces of magnets 16 which are secured to the outer surface of rotor 24. The magnets 16 are attached to flat outer surfaces portions 72 of the rotor 24 by a suitable adhesive. The wire coils 14 and magnets 16 are also shown in FIGS. 2 and 6–8. In addition to bonding the magnets 16 to the outer surface of the rotor 24, the resulting assembly can further be coaxially wrapped with a non-magnetic material such as carbon fibers, to ensure that the magnets will withstand centrifugal forces as the rotor 24 is rotated at high speeds. The stator 6 and rotor 24 can be made from a plurality of laminations that are stacked and secured together in known manners.

FIG. 3 also shows drive end motor housing portion 4 and tie rods 8 that extend through notches 72 provided in the outer surface of the rotor 24.

Figure 4:
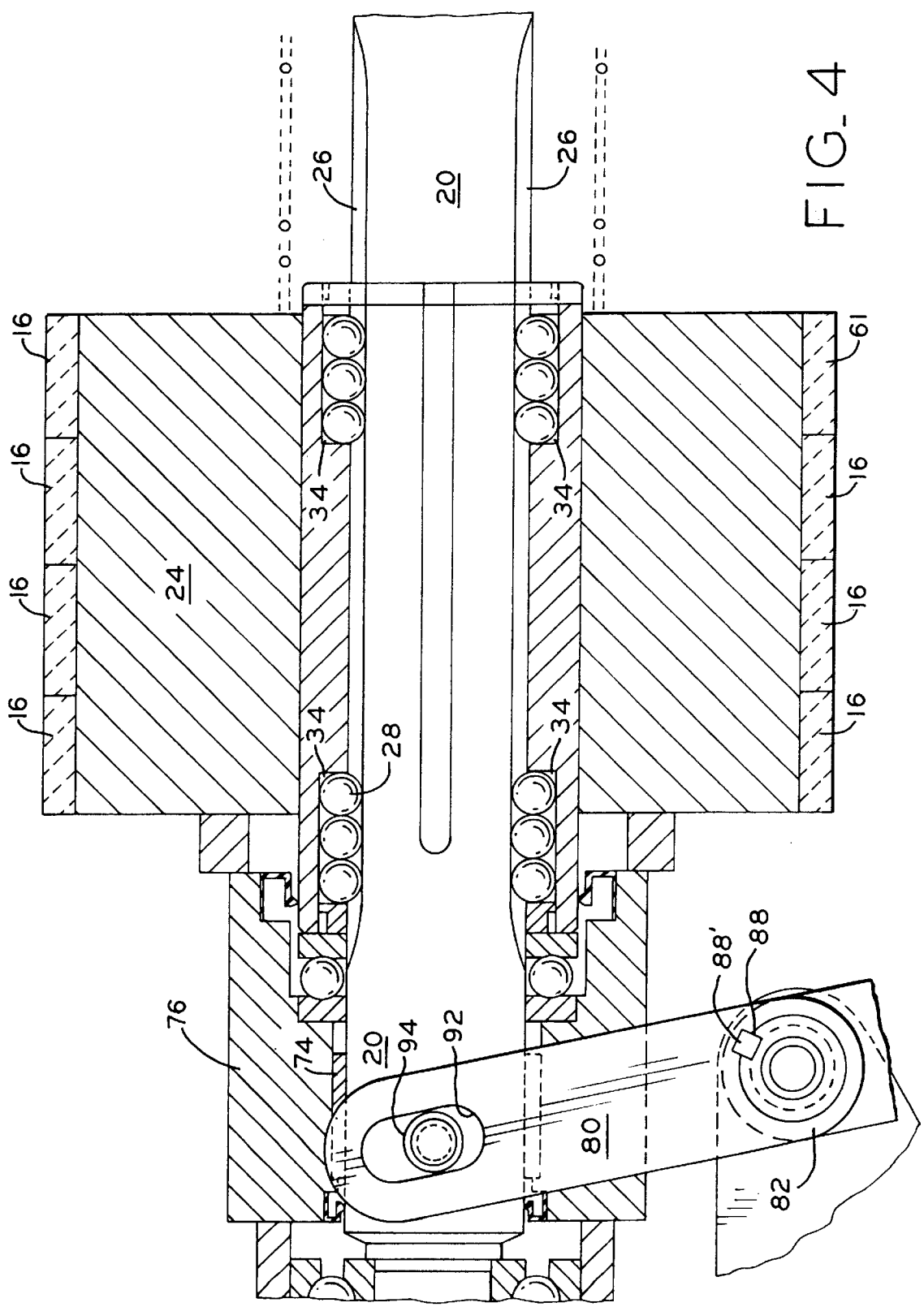
FIG. 4 is an enlarged partial cut away cross-sectional view of the rotor, thrust bearing and constant velocity linear bearing of FIG. 1

FIG. 4 is an enlarged partial cut away cross-sectional view of the rotor, thrust bearing and constant velocity linear bearing in FIG. 2. FIG. 4 depicts a solid bearing 74 that is positioned between motor shaft 20 and thrust bearing housing 76. Bearing 74 can be made from an suitable soft metal such as brass, bronze, etc. or from a plastic bearing material.

FIG. 4 shows that the grooves 34 in the rotor sleeve 32 do not have to be coextensive with the length of the rotor sleeve 32. As shown, a discrete grouping of grooves 34 are provided at both ends of the rotor sleeve 32.

Figure 5:
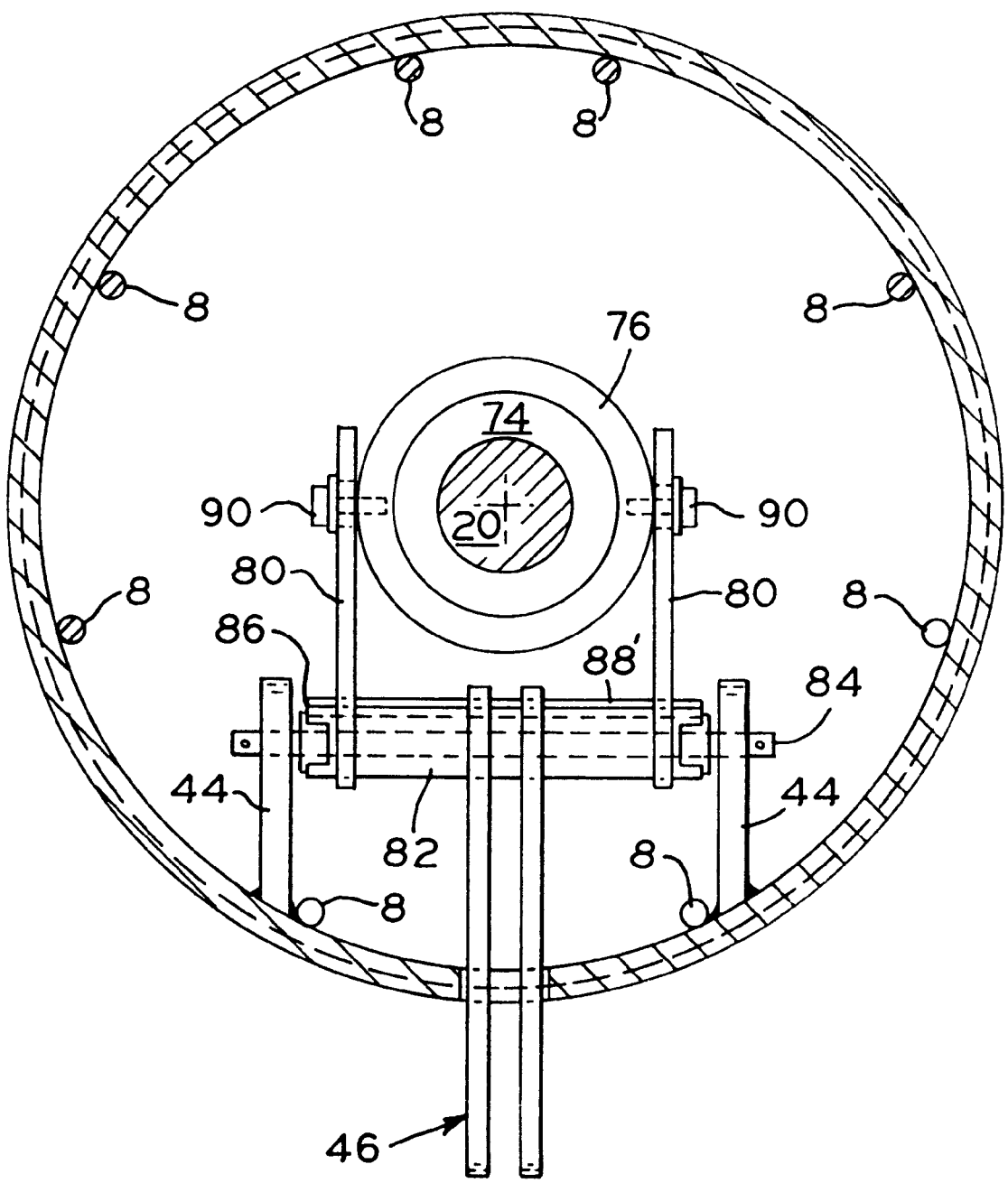
FIG. 5 is an end view of one embodiment of a thrust housing and lever used to adjust the axial position of a rotor according to one embodiment of the present invention.

FIG. 5 is an end view of one embodiment of a thrust housing and lever used to adjust the axial position of a rotor according to one embodiment of the present invention. As shown, the yoke assembly 42 discussed above in reference to FIG. 2 includes a pair of thrust housing lever arms 80 which are fixed to and extend in parallel from torque tube 82. The thrust lever arms 80 are welding to the torque tube 82. To assist in assembling and strengthening the yoke assembly 42 against torsional forces, the torque tube 82 can be provided with a keyway 88 and a key 88' and the ends of the thrust housing lever arms 80 (and the pivot arm(s) 46) can included cutouts that are configured to allow ends of the thrust housing lever arms 80 (and the pivot arm(s) 46) to slide over the torque tube 82 and engage the key 88'. Other engaging/interlocking structural elements could also be used for this purpose.

Torque tube 82 is mounted on a pivot shaft 84 that is coupled to and supported at opposite ends thereof to pivot brackets 44. Bearing 86 are provided on opposite ends of torque tube 82 between the torque tube 82 and pivot shaft 84. Bearings 86 can be made from an suitable soft metal such as brass, bronze, etc. or from a plastic bearing material. As depicted, pivot brackets 44 are secured to the com end motor housing portion 2 by any suitable means such as welding. Alternatively, pivot brackets 44 can be secured to the end plate 10 as shown in FIG. 2.

A pair of shoulder bolts or screws 90 are received in aligned internally threaded bores provided in the outer sides of thrust bearing housing 76. The shoulder bolts or screws 90 pass through elongate slots 92 provided in the free ends of thrust housing lever arms 80 and can have bearings 94 thereon as show in FIGS. 5 and 4. Bearing 74, discussed above, is shown between motor shaft 20 and thrust bearing housing 76.

As shown in FIG. 5, pivot arm 46 comprises two parallel arms which are rigidly coupled to torque tube 82 and extend through a slot or passage in com end motor housing portion 2 as depicted in FIG. 2. The free end of pivot arms 46 are pivotally coupled to the movable end of actuator 48 which is received therebetween. A clevis pin 96 (see FIG. 2) or other element providing a pivotal axis is used to pivotally couple the free ends of pivot arm 46 to movable end of actuator 48.

In an alternative embodiment, a single pivot arm 46 could be used and either the free end thereof or the movable end of actuator 48 could have a yoke structure by which the two could be pivotally coupled together with a suitable coupling pin.

FIG. 2 depicts the opposite end of the actuator 48 as being coupled to the drive end motor housing portion 4. It is noted that the opposite end of the actuator 48 could be coupled to any structure which is fixed relative to the permanent magnet electric machine.

Figure 6:
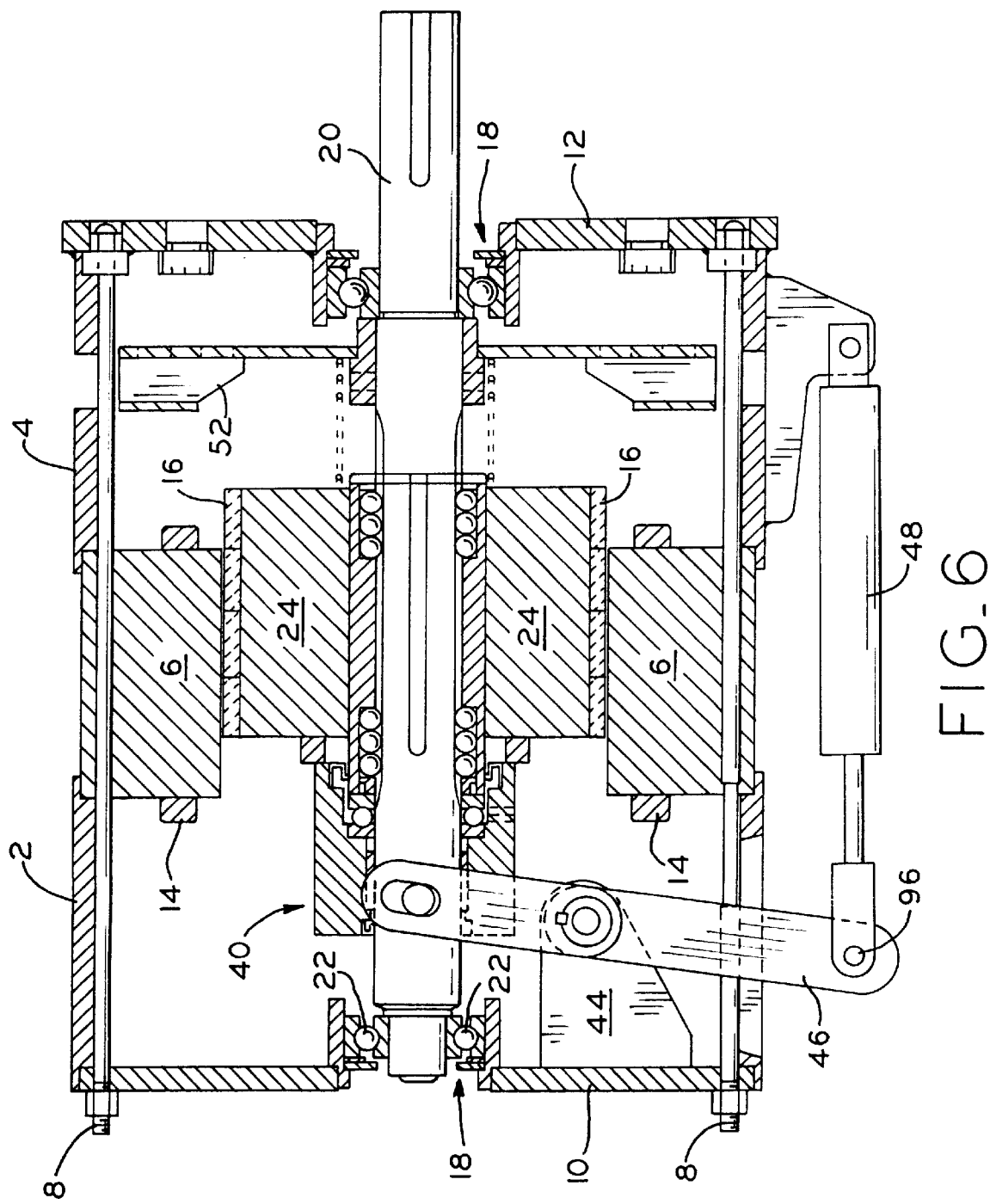
FIG. 6 is cross-sectional view of permanent magnet electric machine according to one embodiment of the present invention in which the rotor is about 25% disengaged with the stator.
Figure 7:
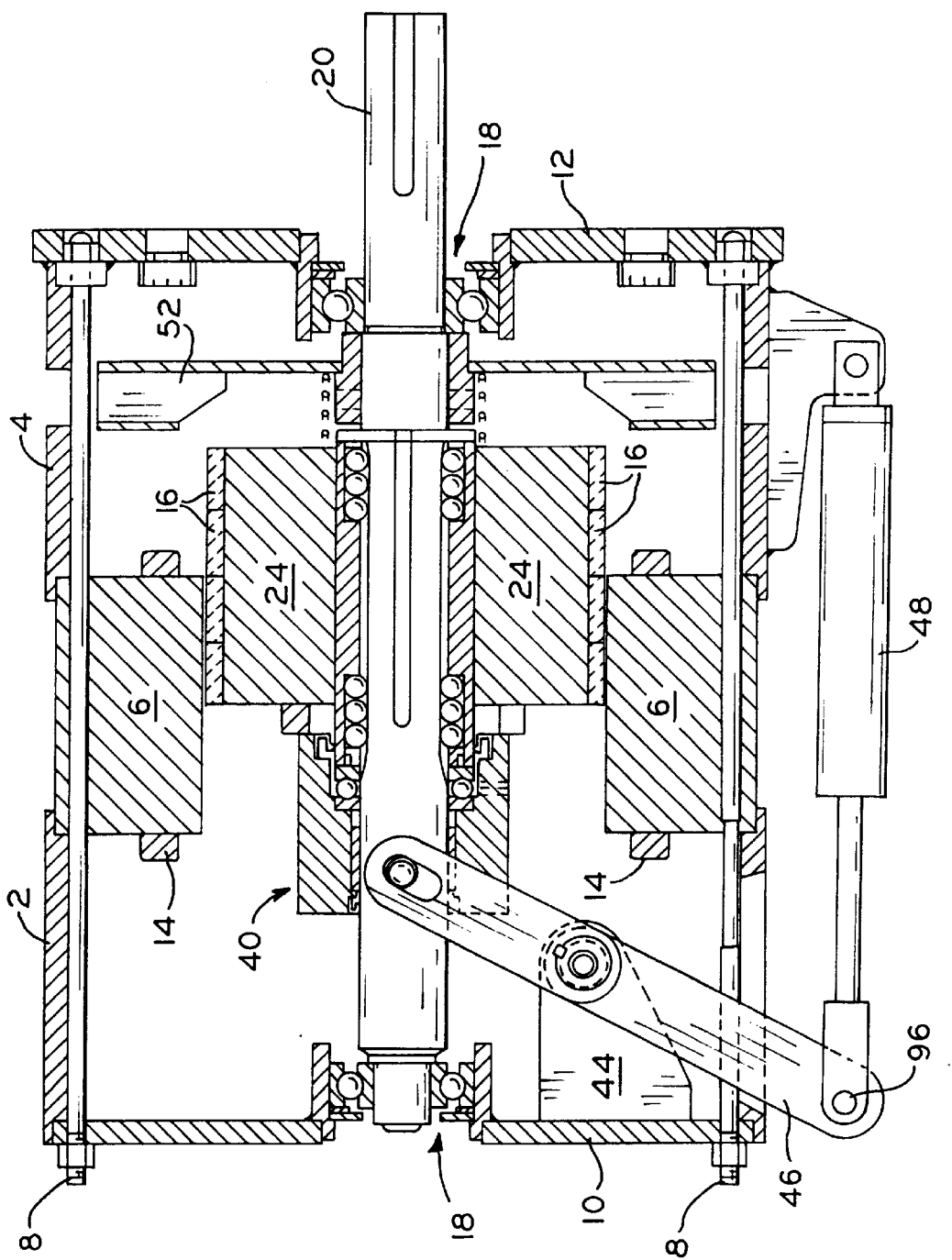
FIG. 7 is cross-sectional view of permanent magnet electric machine according to one embodiment of the present invention in which the rotor is about 50% disengaged with the stator.

FIG. 6 is cross-sectional view of permanent magnet electric machine according to one embodiment of the present invention in which the rotor is about 25% disengaged with the stator. FIG. 7 is cross-sectional view of permanent magnet electric machine according to one embodiment of the present invention in which the rotor is about 50% disengaged with the stator.

FIGS. 2, 6 and 7 can be viewed as illustrating progressive axial movement of the rotor 24, with the rotor 24 in FIG. 2 being in full alignment or engagement with the stator 6, and FIGS. 6 and 7 depicting increasing misalignment or disengagement of the rotor 24 with respect to the stator 6.

The full alignment or engagement of the rotor 24 with the stator 6 depicted in FIG. 2 will produce constant torque up to the base speed as shown in FIG. 1.

The amount of misalignment or disengagement of the rotor 24 with respect to the stator 6 depicted in FIG. 6 is approximately 25%. This amount of misalignment or disengagement will produce an increase in speed of approximately 150% of the base speed.

The amount of misalignment or disengagement of the rotor 24 with respect to the stator 6 depicted in FIG. 6 is approximately 50%. This amount of misalignment or disengagement will produce an increase in speed of approximately 200% of the base speed.

FIGS. 2, 6 and 7 are illustrative of several positions at which the rotor 24 can be moved by actuator 48. It is understood that the rotor 24 can be positioned in an infinite number of positions by actuator 48, so as to offer infinite control and adjustment of speed/torque.

Figure 8:
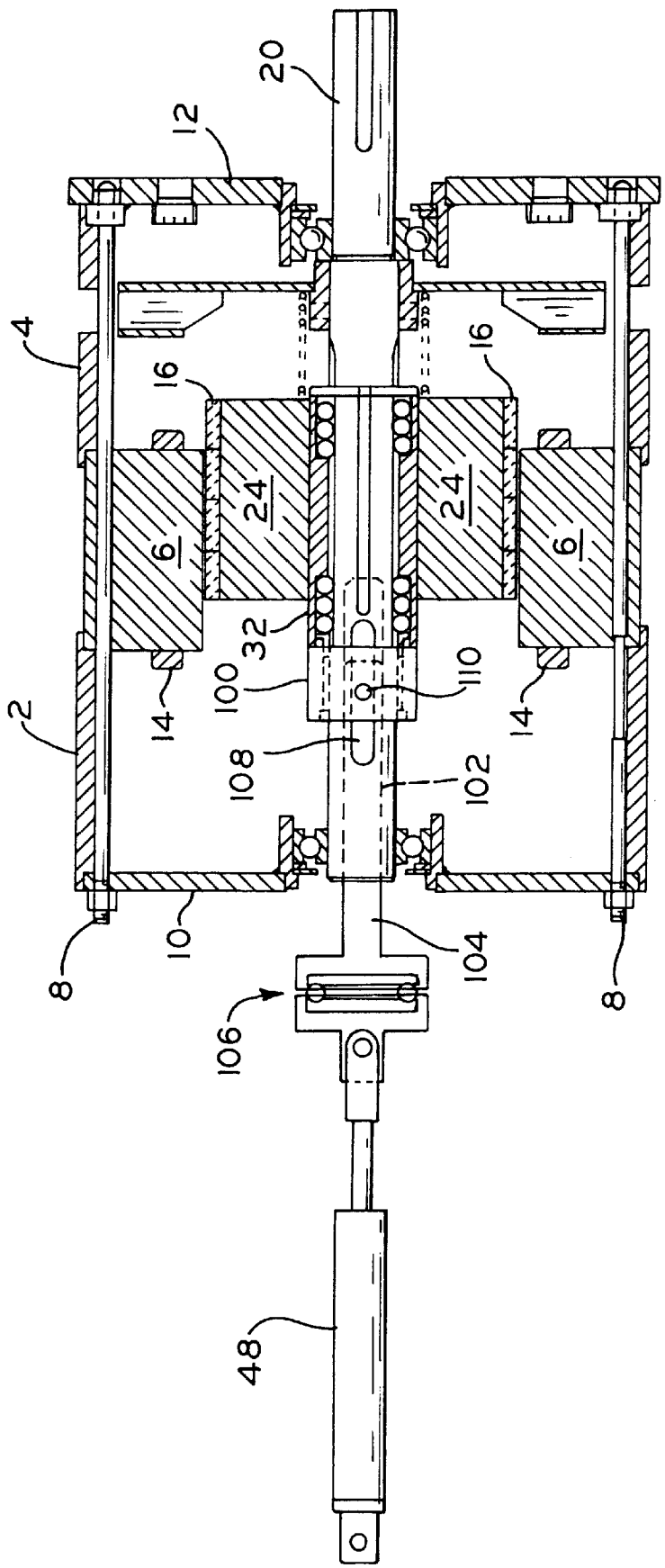
FIG. 8 is a cross-sectional view of permanent magnet electric machine according to another embodiment of the present invention.

FIG. 8 is a cross-sectional view of permanent magnet electric machine according to another embodiment of the present invention. The embodiment of the invention in FIG. 8 uses a linearly aligned actuator without a pivot linkage. In FIG. 8 a thrust sleeve 100 is coupled to the end of rotor sleeve 32, and the motor shaft 20 has a hollow end portion 102 which receives pushrod 104. Pushrod 104 is coupled to hydraulic or pneumatic actuator 48 via a thrust bearing 106 which allows pushrod 104 to rotate with motor shaft 20 and actuator 48 to move axially without rotating. The motor shaft 20 includes a slot 108 in one side thereof through which a cross pin 110 can be inserted to couple pushrod 104 to thrust sleeve 32.

In the embodiments of the invention depicted in FIGS. 2–8, when the actuator 48 is actuated, rotor 24 is pushed out of alignment with stator 6 as it moves along motor shaft 20.

It an alternative arrangement, the actuator 48 can be used to pull the rotor 24 out of alignment with stator 6. For Example, in FIG. 2, the actuator 48 could be turned around so that when the actuator 48 is actuated, rotor 24 moves away from the fan 52. The com end motor housing portion 2 could be lengthened together with the drive end of motor shaft 20 and grooves 26 and 34 to accommodate such a configuration. The embodiment of FIG. 8 could likewise be reconfigured so that actuator 48 pulled the rotor 24 out of alignment with stator 6.

Although a hydraulic or pneumatic actuator is depicted in the figures, it is to be understood that any equivalent means could be used such as a threaded screw driven shaft, a pinion and gear assembly, a cable system, sliding actuator, etc.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A brushless permanent magnet electrical machine which comprises:
    a stator having a plurality of stator magnetic poles and windings for generating a rotating field in the stator magnetic poles, said stator having a central axis and a substantially uniform inner diameter;
    a rotor provided with a plurality of permanent magnets at a peripheral surface thereof and having a central axis which coincides with the central axis of the stator, the rotor further having a substantially uniform outer diameter;
    a rotatable shaft upon which the rotor is coupled so as to rotate therewith, the rotatable shaft having a central axis which coincides with the central axis of the stator;
    means for moving the rotor with respect to the stator along the rotatable shaft without changing a radial distance between the stator and the rotor.

2. A brushless permanent magnet electrical machine according to claim 1, further comprising a housing, the stator being held in a fixed position relative to the housing.

3. A brushless permanent magnet electrical machine according to claim 1, further comprising a constant velocity bearing which couples the rotor to the rotatable shaft.

4. A brushless permanent magnet electrical machine according to claim 1, wherein the brushless permanent magnet electrical machine comprises an alternator.

5. A brushless permanent magnet electrical machine according to claim 1, wherein the means for moving the rotor comprises at least one of a pneumatic means, a hydraulic means, an electromechanical means and a manual means.

6. A brushless permanent magnet electrical machine according to claim 1, wherein the permanent magnets are held in fixed positions at the peripheral surface of the rotor.

7. A brushless permanent magnet electrical machine according to claim 1, further comprising a plurality of ball bearings between the rotor and rotatable shaft.

8. A brushless permanent magnet electrical machine according to claim 7, wherein the rotatable shaft is provided with a plurality of axial grooves for receiving the plurality of ball bearings.

9. A brushless permanent magnet electrical machine according to claim 5, further comprising a thrust bearing assembly which couples the means for moving the rotor to the rotor.

10. A brushless permanent magnet electrical machine according to claim 9, wherein the thrust bearing is pivotally coupled to the rotor.

11. A brushless permanent magnet electrical machine according to claim 10, further comprising a pivotal linkage coupling the means for moving the rotor to the thrust bearing.

12. A brushless permanent magnet electrical machine according to claim 9, wherein the thrust bearing is coupled to the rotor for axial movement therewith.

13. A brushless permanent magnet electrical machine according to claim 12, further comprising a pushrod coupling the means for moving the rotor to the thrust bearing.

14. A method of operating a brushless permanent magnet electric machine beyond its normal base speed which comprises:
    providing a brushless permanent magnet electric machine having a stator with a substantially uniform inner diameter, a rotor with a substantially uniform outer diameter, and a rotatable shaft upon which the rotor is coupled so as to rotate therewith; and
    moving the rotor with respect to the stator along the rotatable shaft without changing a radial distance between the stator and the rotor.

15. A method of operating a brushless permanent magnet electric machine beyond its normal base speed according to claim 14, wherein the permanent magnet electric machine includes a housing and the method further comprises securing the stator in a fixed position relative to the housing.

16. A method of operating a brushless permanent magnet electric machine beyond its normal base speed according to claim 14, wherein the brushless permanent electrical machine comprises an alternator.

17. A method of operating a brushless permanent magnet electric machine beyond its normal base speed according to claim 14, wherein the step of moving the rotor with respect to the stator involves manipulating a pivotal mechanism.

18. A method of operating a brushless permanent magnet electric machine beyond its normal base speed according to claim 14, wherein the step of moving the rotor with respect to the stator involves manipulating a pushrod coupled to the rotor.

19. A brushless permanent magnet electrical machine according to claim 1 in combination with a vehicle in which combination the brushless permanent electrical machine drives the vehicle.

20. The combination of claim 19, wherein the brushless permanent magnet electrical machine further generates a voltage when the vehicle brakes.

21. A brushless permanent magnet electrical machine according to claim 1 in combination with a power generator system in which combination the brushless permanent magnet electrical machine comprises a generator.

22. The combination of claim 21 wherein permanent magnet electrical machine comprises a wind powered generator.

* * * * *